(12) United States Patent (10) Patent No.: US 12,361,753 B2
Umeda (45) Date of Patent: Jul. 15, 2025

(54) FACE AUTHENTICATION APPARATUS, FACE AUTHENTICATION METHOD, AND COMPUTER-READABLE RECORDING MEDIUM

(71) Applicant: NEC Solution Innovators, Ltd., Tokyo (JP)

(72) Inventor: Kazuhide Umeda, Tokyo (JP)

(73) Assignee: NEC Solution Innovators, Ltd., Tokyo (JP)

( * ) Notice: Subject to any disclaimer, the term of this patent is extended or adjusted under 35 U.S.C. 154(b) by 787 days.

(21) Appl. No.: 17/615,871

(22) PCT Filed: May 28, 2020

(86) PCT No.: PCT/JP2020/021182
§ 371 (c)(1),
(2) Date: Dec. 2, 2021

(87) PCT Pub. No.: WO2020/246368
PCT Pub. Date: Dec. 10, 2020

(65) Prior Publication Data
US 2022/0309829 A1 Sep. 29, 2022

(30) Foreign Application Priority Data
Jun. 5, 2019 (JP) ................. 2019-105725

(51) Int. Cl.
*G06V 40/16* (2022.01)
*G06V 10/94* (2022.01)
*G06V 40/50* (2022.01)
(52) U.S. Cl.
CPC .......... *G06V 40/172* (2022.01); *G06V 10/945* (2022.01); *G06V 40/50* (2022.01)

(58) Field of Classification Search
CPC .... G06V 40/172; G06V 10/945; G06V 40/50; G06V 10/74; G06F 2218/12; G06T 7/00
See application file for complete search history.

(56) References Cited

U.S. PATENT DOCUMENTS 7,266,224 B2 * 9/2007 Sukegawa .............. G06V 40/50
382/118
8,401,245 B2 * 3/2013 Hashimoto .............. G07C 9/37
340/5.82
(Continued)

FOREIGN PATENT DOCUMENTS

JP 2004302645 A * 10/2004
JP 2013117876 A * 6/2013
(Continued)

OTHER PUBLICATIONS

International Search Report for PCT Application No. PCT/JP2020/021182, mailed on Aug. 18, 2020.
(Continued)

*Primary Examiner* — Oneal R Mistry
*Assistant Examiner* — Jongbong Nah

(57) ABSTRACT

A face authentication apparatus includes: an acquisition unit that acquires face image data of a person from image capturing apparatuses, a determination unit that determines whether registration data, having degree of matching with the face image data that is equal to or more than a threshold value, is registered in a storage device, a prompting unit that prompts the person to input identifying information when the determination unit determines that the registration data is not registered in the storage device, a reception unit that receives the identifying information input, a registration after input reception unit that registers the face image data as registration data in the storage device when the reception unit successfully receives an input of the identifying information, and a setting unit that sets a threshold value, to be (Continued)

used by the determination unit, in association with the registration data registered by the registration after input reception unit.

14 Claims, 12 Drawing Sheets

(56) References Cited

U.S. PATENT DOCUMENTS

| | | | |
|---|---|---|---|
| 2015/0324630 A1* | 11/2015 | Sandler | G06F 18/2321 |
| | | | 382/118 |
| 2018/0068110 A1* | 3/2018 | Watanabe | G06F 21/32 |
| 2020/0175261 A1* | 6/2020 | Shimizu | G06F 21/32 |

FOREIGN PATENT DOCUMENTS

| | | |
|---|---|---|
| JP | 2014-067352 A | 4/2014 |
| JP | 2018-045682 A | 3/2018 |

OTHER PUBLICATIONS

English translation of Written opinion for PCT Application No. PCT/JP2020/021182, mailed on Aug. 18, 2020.

* cited by examiner

Fig.3

| IMAGE CAPTURING APPARATUS ID | PERSON A | | PERSON B | |
|---|---|---|---|---|
| | REGISTRATION DATA | THRESHOLD VALUE | REGISTRATION DATA | THRESHOLD VALUE |
| IMAGE CAPTURING APPARATUS IN AREA 1 | IMAGE CAPTURING APPARATUS A | A1 | 70 | | |
| | IMAGE CAPTURING APPARATUS A | | | | |
| IMAGE CAPTURING APPARATUS IN AREA 2 | IMAGE CAPTURING APPARATUS B | | | B3 | 75 |
| | IMAGE CAPTURING APPARATUS B | | | | |

Fig. 4

| IMAGE CAPTURING APPARATUS | IMAGE CAPTURING ID | PERSON A | | PERSON B | |
|---|---|---|---|---|---|
| | | REGISTRATION DATA | THRESHOLD VALUE | REGISTRATION DATA | THRESHOLD VALUE |
| IMAGE CAPTURING APPARATUS IN AREA 1 | IMAGE CAPTURING APPARATUS A | A1 | 70 | | |
| | IMAGE CAPTURING APPARATUS A | A2 | 70 | | |
| IMAGE CAPTURING APPARATUS IN AREA 2 | IMAGE CAPTURING APPARATUS B | | | B3 | 75 |
| | IMAGE CAPTURING APPARATUS B | | | | |

Fig.5

| IMAGE CAPTURING APPARATUS | IMAGE CAPTURING ID | PERSON A | | PERSON B | |
|---|---|---|---|---|---|
| | | REGISTRATION DATA | THRESHOLD VALUE | REGISTRATION DATA | THRESHOLD VALUE |
| IMAGE CAPTURING APPARATUS IN AREA 1 | IMAGE CAPTURING APPARATUS A | A1 | 70 | | |
| | IMAGE CAPTURING APPARATUS A | | | | |
| IMAGE CAPTURING APPARATUS IN AREA 2 | IMAGE CAPTURING APPARATUS B | | | B3 | 75 |
| | IMAGE CAPTURING APPARATUS B | | | B4 | 80 |

FACE AUTHENTICATION APPARATUS, FACE AUTHENTICATION METHOD, AND COMPUTER-READABLE RECORDING MEDIUM

This application is a National Stage Entry of PCT/JP2020/021182 filed on May 28, 2020, which claims priority from Japanese Patent Application 2019-105725 filed on Jun. 5, 2019, the contents of all of which are incorporated herein by reference, in their entirety.

TECHNICAL FIELD

The present invention relates to a face authentication apparatus and a face authentication method that images a user's face and authenticates the user, and further relates to a computer-readable recording medium that includes a program recorded thereon, the program being intended to realize these apparatus and method.

BACKGROUND ART

Conventionally, a technique using face authentication that identifies a user by imaging the user's face with an image capturing apparatus has been known. Face authentication is used for security management such as entrance/exit management of offices and usage management of electronic devices. When using face authentication, an administrator needs to register the captured user's face image and the user's personal information in association with each other, and if the user's face image and the like are not registered, it is necessary to perform the registration work each time, which imposes a burden on the administrator.

Patent Document 1 discloses a system capable of performing face authentication while reducing the workload of the administrator. The system described in Patent Document 1 uses face authentication to determine whether a user has the authority to use an MFP (Multifunction Peripheral). In this system, face authentication is performed when the tag number of the wireless tag held by the user over the reader is associated with the feature point information of the user's face, and when the authentication is successful, the MFP is ready for use. When the feature point information of the user's face is not associated, the feature point information is acquired from the captured image obtained by imaging the range in which the wireless tag and the reader can communicate wirelessly, and the acquired feature point information and the tag number are registered in association with each other. As a result, it is possible to reduce the workload of the administrator, such as registering the feature point information of the user's face.

LIST OF RELATED ART DOCUMENTS

Patent Document

Patent Document 1: Japanese Patent Laid-Open Publication No. 2018-45682

SUMMARY OF INVENTION

Problems to be Solved by the Invention

In the system described in Patent Document 1, depending on the installation location of the MFP, the imaging environment may differ depending on the time of day, even at the same imaging location. For example, if the MFP is installed in a location where the light shines differently during the day and at night, the obtained captured image varies depending on the influence of the light shining on the user's face or the shadows on the user's face. In this case, even if the face image (feature point information) for face authentication is registered, the face authentication may not succeed.

An example of object of the present invention is to provide a face authentication apparatus, a face authentication method, and a computer-readable recording medium that improve the accuracy of face authentication while reducing the burden on an administrator.

Means for Solving the Problems

In order to achieve the above object, a face authentication apparatus in one aspect of the present invention includes:
  an acquisition unit configured to acquire face image data of a person from an image capturing apparatus,
  a determination unit configured to determine whether registration data, having degree of matching with the face image data that is equal to or more than a threshold value, is registered in a storage device,
  a prompting unit configured to prompt the person to input identifying information when the determination unit determines that the registration data is not registered in the storage device,
  a reception unit configured to receive the identifying information input,
  a registration after input reception unit configured to register the face image data as registration data in the storage device when the reception unit successfully receives an input of the identifying information, and
  a setting unit configured to set a threshold value, to be used by the determination unit, in association with the registration data registered by the registration after input reception unit.

Further, in order to achieve the above object, a face authentication method in one aspect of the present invention includes:
  a step of acquiring face image data of a person from an image capturing apparatus,
  a step of determining whether registration data, having degree of matching with the face image data that is equal to or more than a threshold value, is registered in a storage device,
  a step of prompting the person to input identifying information when it is determined that the registration data is not registered in the storage device,
  a step of receiving the identifying information input,
  a step of registering the face image data as registration data in the storage device when an input of the identifying information is successfully received, and
  a step of setting a threshold value, to be used in the step of determining, in association with the registration data registered.

Further, in order to achieve the above object, a computer-readable recording medium that includes a program recorded thereon, the program including instructions that cause a computer to execute:
  a step of determining whether registration data, having degree of matching with the face image data of a person acquired from an image capturing apparatus that is equal to or more than a threshold value, is registered in a storage device,
  a step of prompting the person to input identifying information when it is determined that the registration data is not registered in the storage device, a step of receiving the identifying information input, a step of registering the face image data as registration data in the storage device when an input of the identifying information is successfully received, and a step of setting a threshold value, to be used in the step of determining, in association with the registration data registered.

Advantageous Effects of the Invention

As described above, according to the present invention, it is possible to improve the accuracy of the face authentication by registering the registration data for face authentication and setting the threshold value in association with the registration data, without requiring the administrator to take time and effort.

BRIEF DESCRIPTION OF THE DRAWINGS

FIG. 3 is a diagram showing a database referred to at the time of face authentication.

FIG. 4 is a diagram showing a database in which registration data is newly registered by the registration after input reception unit.

FIG. 5 is a diagram showing a database in which registration data is registered by the additional registration unit.

EXAMPLE EMBODIMENTS

Hereinafter, a face authentication apparatus, a face authentication method, and a computer-readable recording medium according to the example embodiment will be described with reference to the drawings.

Example Embodiment 1

[Apparatus Configuration]

Figure 1:
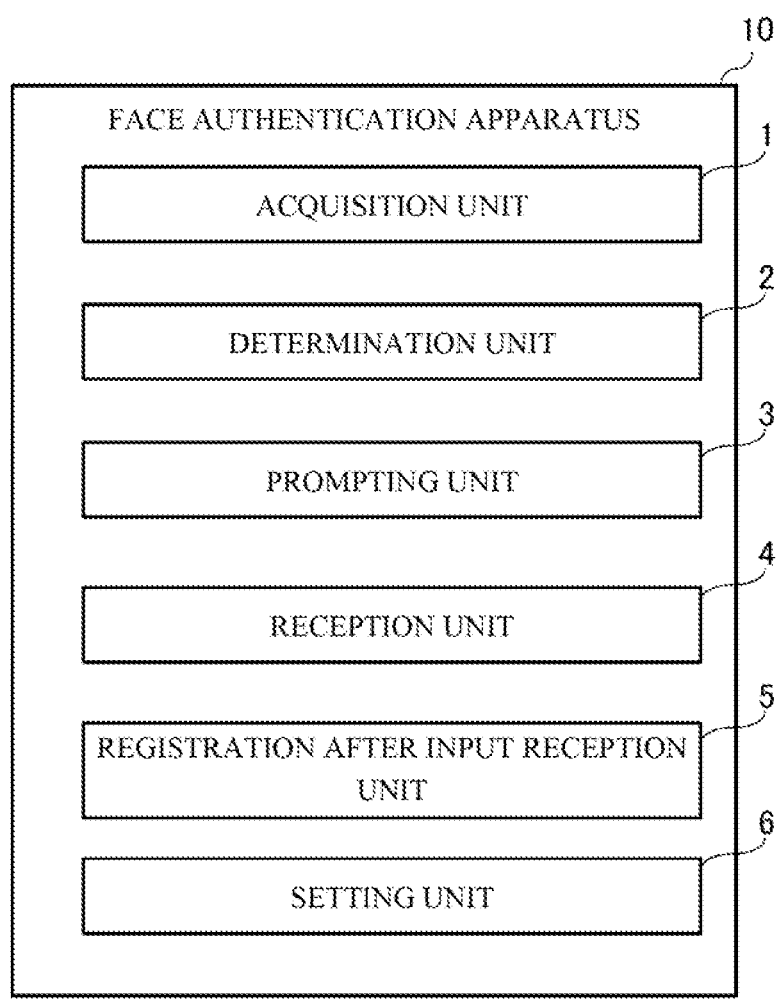
FIG. 1 is a diagram showing a configuration of a face authentication apparatus according to the example embodiment 1.

First, a configuration of the face authentication apparatus according to the example embodiment 1 will be described with reference to FIG. 1. FIG. 1 is a diagram showing a configuration of the face authentication apparatus 10 according to the example embodiment 1.

The face authentication apparatus 10 is an apparatus that performs the face authentication using face image data of a person captured by the image capturing apparatus. The face authentication apparatus 10 includes an acquisition unit 1, a determination unit 2, a prompting unit 3, a reception unit 4, a registration after input reception unit 5, and a setting unit 6.

The acquisition unit 1 acquires the face image data of the person from the image capturing apparatus.

The determination unit 2 determines whether registration data, having degree of matching with the face image data that is equal to or more than a threshold value, is registered in a storage device. The registration data is face image data of a person captured by the image capturing apparatus, and is a collation data used at the time of face authentication. The degree of matching is a score that indicates the degree of matching between the face image data and the registration data.

When the determination unit 2 determines that the registration data is not registered in the storage device, the prompting unit 3 prompts the person, whose face image data is acquired by the acquisition unit 1, to input identifying information.

The reception unit 4 receives the input identifying information.

When the reception unit 4 successfully receives the identifying information, the registration after input reception unit 5 registers the face image data acquired by the acquisition unit 1 in the storage device as the registration data.

The setting unit 6 sets the threshold value, to be used by the determination unit 2, in association with the registration data registered by the registration after input reception unit 5.

As described above, in the example embodiment 1, if the registration data that matches the face image data of the person captured by the image capturing apparatus is not stored in the storage device, the face image data can be registered as the registration data for face authentication without requiring the administrator to take time and effort. Even when it is determined that the registration data matching the face image data of the person is stored, there is a possibility of false authentication if the degree of matching is low. Thus, by registering new face image data as registration data and setting a new threshold value, the registration data can be registered without requiring the administrator to take time and effort, and the accuracy of the face authentication can be improved.

Figure 2:
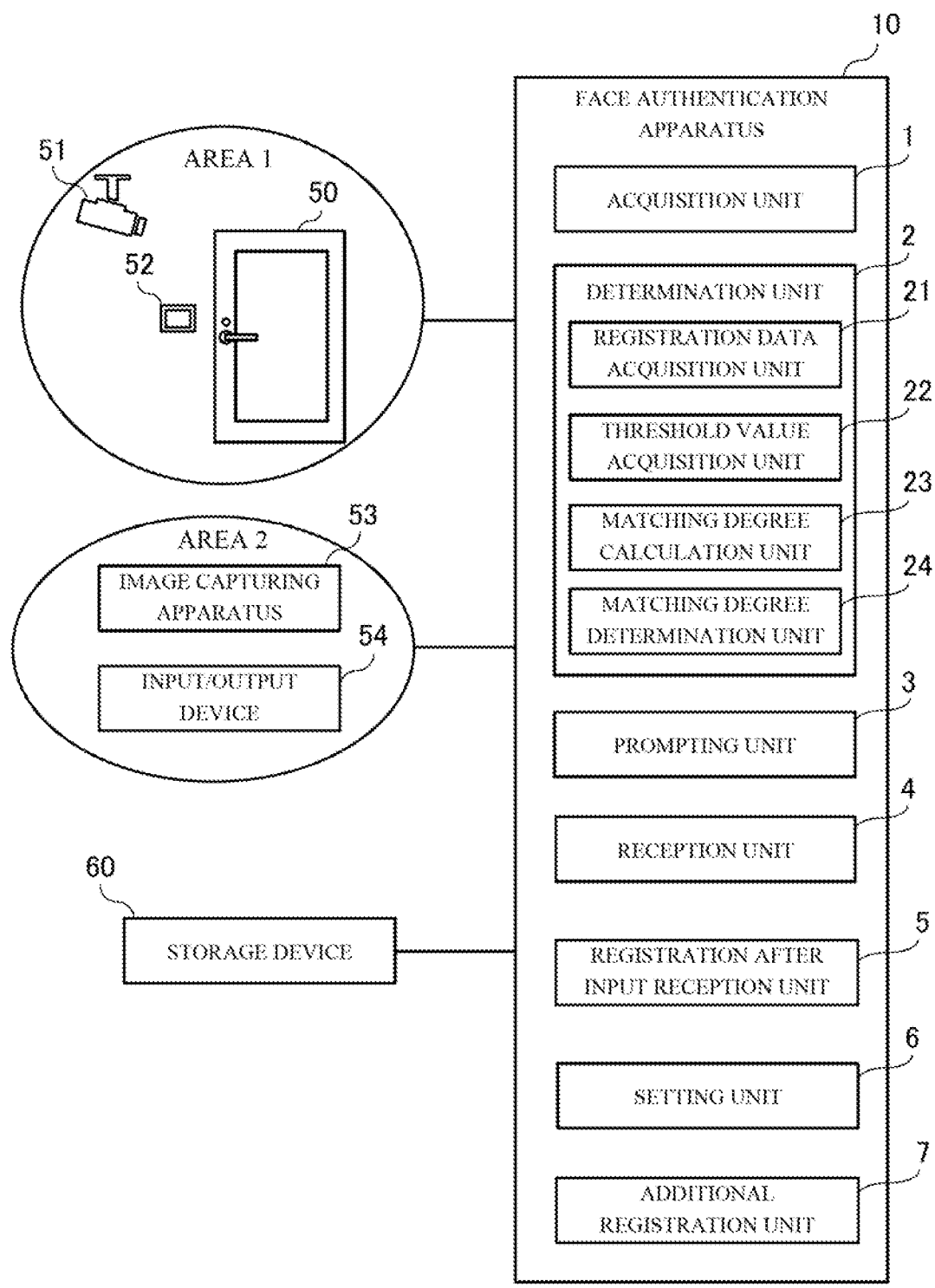
FIG. 2 is a block diagram specifically showing a configuration of the face authentication apparatus according to the example embodiment 1.

Subsequently, the configuration and functions of the face authentication apparatus 10 according to the example embodiment 1 will be explained in detail by using FIGS. 2 and 3. FIG. 2 is a block diagram specifically showing the configuration of the face authentication apparatus 10 according to the example embodiment 1. FIG. 3 is a diagram showing a database referred to at the time of face authentication.

In the example embodiment 1, the authentication apparatus 10 will be described as an apparatus that performs face authentication of a person entering and exiting areas 1 and 2 (for example, a room or a building). An image capturing apparatus 51 and an input/output device 52 are installed at the entrance 50 of the area 1. Similarly, an image capturing apparatus 53 and an input/output device 54 are installed at the entrance of the area 2. The face authentication apparatus 10 can be connected to the image capturing apparatuses 51 and 53 and the input/output devices 52 and 54 respectively, in a wired or wireless manner.

The image capturing apparatus 51 is an apparatus that images a face of a person standing in front of the entrance 50 of the area 1. The input/output device 52 is a device that is arranged near the entrance 50 and has a function of accepting operations by a target person for face authentication and outputting a message to the person. The same applies to the image capturing apparatus 53 and the input/output device 54 in the area 2.

Unique identification information (hereinafter referred to as an image capturing ID) is set in each of the image capturing apparatuses 51 and 53. In the example embodiment 1, the image capturing ID of the image capturing apparatus 51 is "image capturing apparatus A", and the image capturing ID of the image capturing apparatus 53 is "image capturing apparatus B".

The face authentication apparatus 10 can be connected to a storage device 60 in a wired or wireless manner. The storage device 60 stores the database shown in FIG. 3. Registration data is registered in the database. The registration data is registered in association with the image capturing IDs of the image capturing apparatuses 51 and 53 that capture the face image data and the person corresponding to the face image data (person A and person B in FIG. 3). For example, the registration data A1 shown in FIG. 3 is face image data of the person A captured by the image capturing apparatus 51 having "image capturing apparatus A" as the image capturing ID.

A threshold value associated with the registration data is registered in the database. As described in detail later, the threshold value is a reference value for collation used at the time of face authentication. Although the database shown in FIG. 3 is stored in the storage device 60 outside the face authentication apparatus 10, it may be stored in the storage device inside the face authentication apparatus 10.

As shown in FIG. 2, the face authentication apparatus 10 further includes an additional registration unit 7 in addition to the acquisition unit 1, the determination unit 2, the prompting unit 3, the reception unit 4, the registration after input reception unit 5, and the setting unit 6 described above.

The acquisition unit 1 acquires the face image data of the person captured by a plurality of image capturing apparatuses 51 and 53, from the image capturing apparatuses 51 and 53.

The determination unit 2 includes a registration data acquisition unit 21, a threshold value acquisition unit 22, a matching degree calculation unit 23, and a matching degree determination unit 24.

The registration data acquisition unit 21 acquires the registered registration data one by one from the database shown in FIG. 3. The threshold value acquisition unit 22 acquires the threshold value associated with the registration data acquired by the registration data acquisition unit 21. The matching degree calculation unit 23 calculates the degree of matching by comparing the face image data acquired by the acquisition unit 1 with the registration data acquired by the registration data acquisition unit 21. The matching degree determination unit 24 determines whether the degree of matching calculated by the matching degree calculation unit 23 is equal to or more than the threshold value acquired by the threshold value acquisition unit 22.

Taking FIG. 3 as an example, the registration data acquisition unit 21 acquires the registration data A1 from the database. The threshold value acquisition unit 22 acquires the threshold value "70" associated with the registration data A1. The matching degree calculation unit 23 compares the face image data acquired by the acquisition unit 1 with the registration data A1 and calculates the degree of matching. The matching degree determination unit 24 determines whether the degree of matching calculated by the matching degree calculation unit 23 is equal to or more than the threshold value "70". Assuming that the threshold value calculated by the matching degree calculation unit 23 is "65", the registration data acquisition unit 21 subsequently acquires the registration data B3, and the threshold value acquisition unit 22 acquires the threshold value "75". Then, the matching degree calculation unit 23 and the matching degree determination unit 24 perform the same processing.

Note, the existing face authentication technology can be used in the calculation of the degree of matching performed by the matching degree calculation unit 23 of the determination unit 2. Examples of the existing face authentication technology include the face authentication technology disclosed in Japanese Patent Laid-Open Publication No. 2006-338902. The face authentication technology is not limited to the existing one, and may be a technology to be developed in the future.

When the registration data acquisition unit 21 cannot acquire the registration data, that is, when no registration data is registered in the database, the prompting unit 3 prompts the person, whose face image data is acquired by the acquisition unit 1, to input the identification information. Further, the prompting unit 3 performs the same processing when the registration data, having the degree of matching calculated by the matching degree calculation unit 23 that is equal to or more than the threshold value acquired by the threshold value acquisition unit 22, is not registered in the database.

As a method of prompting the input of the identification information, for example, when the acquisition unit 1 acquires the face image data from the image capturing apparatus 51 in the area 1, the prompting unit 3 outputs a signal to the input/output device 52 in the same area 1. When the input/output device 52 receives the signal, the input/output device 52 outputs a message prompting the input of the identification information from the display or the speaker. The identification information is unique information assigned to an individual in advance. The identification information may be a key code, such as a number or a string of characters, entered manually from the input/output devices 52 and 54, or may be tag information registered on the IC tag, which is input by holding the IC tag over the input/output devices 52 and 54.

The reception unit 4 receives the identification information input from the input/output devices 52 and 54.

The registration after input reception unit 5 determines whether the reception unit 4 successfully receives the identification information. For example, the storage device 60 stores the identification information assigned to an individual in advance. The registration after input reception unit 5 determines whether the identification information received by the reception unit 4 is stored in the storage device 60. When the registration after input reception unit 5 determines that the reception unit 4 successfully receives the identification information, the registration after input reception unit 5 determines that the person who inputs the identification information is the person to be managed by the face authentication. Then, as shown in FIG. 3, the registration after input reception unit 5 registers the face image data acquired by the acquisition unit 1 as the registration data.

At this time, if other registration data is registered in advance in association with the image capturing ID of the image capturing apparatus and the person, which are both to be associated with registration data to be newly registered, the registration after input reception unit 5 newly registers the registration data in a storage area different from a storage area in which the registration data is registered in advance. This will be described with reference to FIG. 4.

FIG. 4 is a diagram showing a database in which registration data is newly registered by the registration after input reception unit 5. For example, the degree of matching between the face image data acquired by the acquisition unit 1 from the image capturing apparatus 51 and the registration data A1 acquired by the registration data acquisition unit 21, as calculated by the matching degree calculation unit 23 of the determination unit 2, is "60". In this case, the registration after input reception unit 5 registers the face image data acquired by the acquisition unit 1 as the registration data A2 in the database without overwriting the registration data A1. In this way, by accumulating the registration data without overwriting it, it can be managed as, for example, a registration log.

The setting unit 6 registers the threshold value in the database in association with the registration data registered by the registration after input reception unit 5. When the registration data, having the degree of matching calculated by the matching degree calculation unit 23 that is equal to or more than the threshold value, is not registered in the database, the setting unit 6 registers a predetermined threshold value ("70" in the case of the registration data A2 of FIG. 4) in the database. The threshold value to be set in this case is a predetermined value based on an empirical rule or the like, and may be changed as appropriate.

When the determination unit 2 determines that the registration data, having the degree of matching with the face image data that is equal to or more than the threshold value, is registered in the storage device 60, the additional registration unit 7 registers the face image data acquired by the acquisition unit 1 in the storage device 60 as additional registration data. For example, if the degree of matching is "85" as a result of comparing the face image data of person B acquired by the acquisition unit 1 from the image capturing apparatus 53 with the registration data B3, the additional registration unit 7 registers the face image data as registration data B4 in the database, as shown in FIG. 5. FIG. 5 is a diagram showing the database in which the registration data is registered by the additional registration unit.

When the setting unit 6 sets a threshold value for the registration data additionally registered by the additional registration unit 7, the setting unit 6 determines the threshold value from the degree of matching calculated by the matching degree calculation unit 23. Specifically, the setting unit 6 uses a value obtained by subtracting a predetermined value a from the degree of matching calculated by the matching degree calculation unit 23 as a threshold value. The predetermined value a is a value determined by an empirical rule or the like, and may be changed as appropriate. If the degree of matching calculated by the matching degree calculation unit 23 is "85" as in the above example, the setting unit 6 registers the value "80", which is obtained by subtracting a predetermined value "5" from the degree of matching "85", as the threshold value in association with the registration data B4 (see FIG. 5).

[Apparatus Operations]

Figure 6:
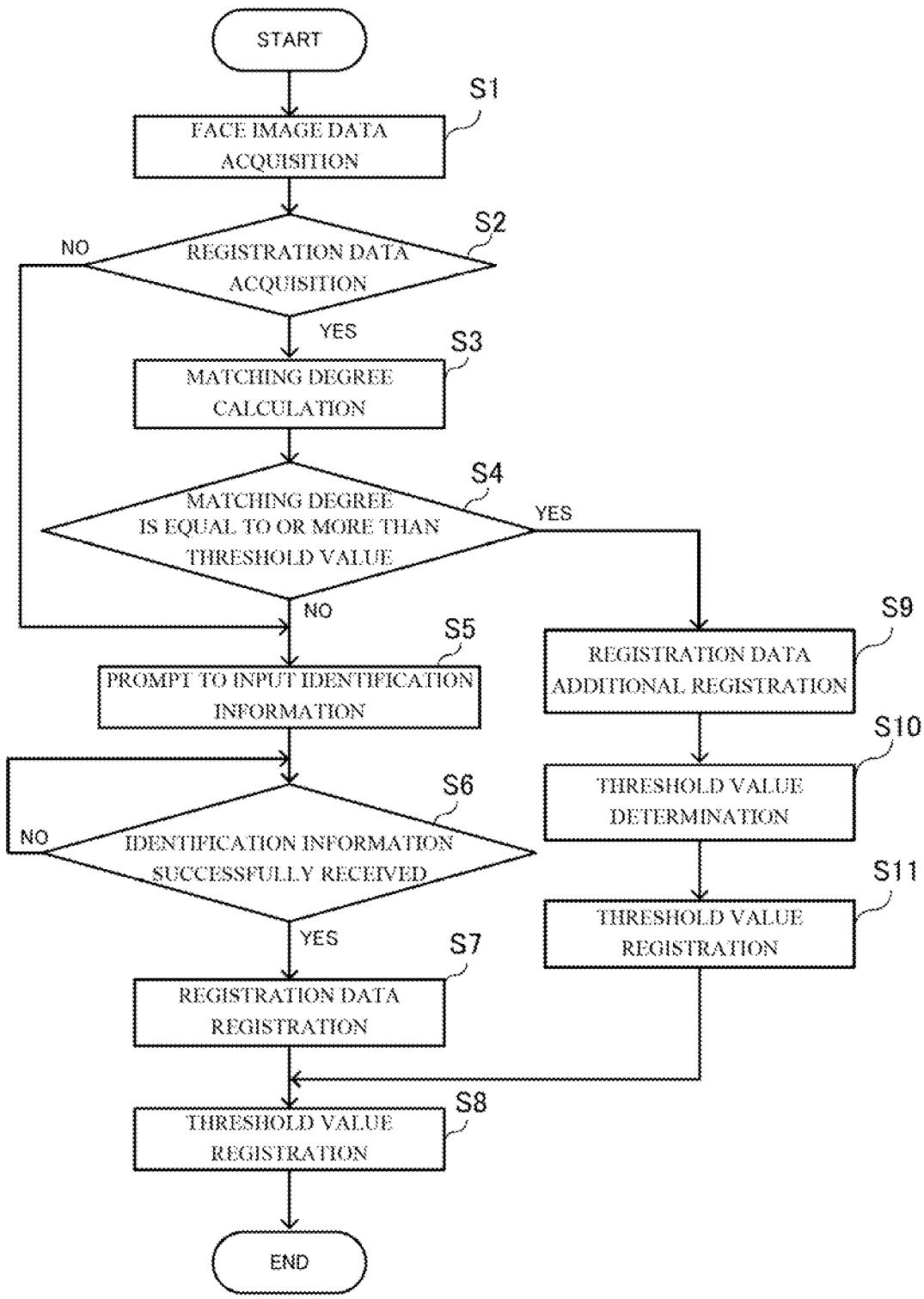
FIG. 6 is a flow diagram showing a process executed by the face authentication apparatus according to the example embodiment 1.

Next, the operation of the face authentication apparatus 10 according to the example embodiment 1 will be described with reference to FIG. 6. FIG. 6 is a flow diagram showing the process executed by the face authentication apparatus 10 according to the example embodiment 1. In the following description, FIGS. 1 to 5 will be referred as appropriate.

Further, in the example embodiment 1, the face authentication method is implemented by operating the face authentication apparatus 10. Therefore, the description of the face authentication method in the example embodiment 1 will be replaced with the following description of the operation of the face authentication apparatus 10.

The acquisition unit 1 acquires face image data (S1). The registration data acquisition unit 21 of the determination unit 2 acquires the registration data from the database stored in the storage device 60 (S2). At this time, when the registration data acquisition unit 21 cannot acquire the registration data (S2: NO), that is, when no registration data is registered in the database of FIG. 3, the prompting unit 3 executes the process of S5 described later. When the registration data acquisition unit 21 acquires the registration data (S2: YES), the matching degree determination unit 24 calculates the degree of matching between the face image data acquired in S1 and the registration data acquired in S2 (S3).

The threshold value acquisition unit 22 of the determination unit 2 acquires the threshold value associated with the registration data acquired in S2, and the matching degree determination unit 24 determines whether the degree of matching calculated in S3 is equal to or more than the threshold value (S4). When the calculated degree of matching is not equal to or more than the threshold value (S4: NO), the prompting unit 3 prompts the target person to input the identification information (S5).

The registration after input reception unit 5 determines whether or not the reception unit 4 successfully receives the identification information (S6). When the reception unit 4 does not successfully receive the identification information (S6: NO), the registration after input reception unit 5 waits until the reception unit 4 successfully receives the identification information. In this case, the prompting unit 3 may again prompt the target person to input the identification information. Further, the process may be terminated after a certain period of time.

When the reception unit 4 successfully receive the identification information (S6: YES), the registration after input reception unit 5 registers the face image data acquired in S1 in the database as registration data (S7). Then, the setting unit 6 registers the predetermined threshold value in association with the registration data registered in S7 (S8).

When the degree of matching calculated in S3 is equal to or more than the threshold value (S4: YES), the additional registration unit 7 registers the face image data acquired in S1 as additional registration data in the storage device 60 (S9). The setting unit 6 determines the threshold value based on the degree of matching calculated in S3 (S10). Then, the setting unit 6 registers the determined threshold value in association with the registration data stored in S9 (S11).

As described above, in the example embodiment 1, when the registration data that matches the face image data of the person captured by the image capturing apparatus 51 or 53 is not registered in the storage device 60, the face image data can be registered as the registration data for face authentication without requiring the administrator to take time and effort. Even when the registration data matching the face image data of the person is stored, there is a possibility of false authentication if the degree of matching is low. Thus, by additionally registering new face image data as registration data and setting a new threshold value, the registration data can be registered without requiring the administrator to take time and effort, and the accuracy of the face authentication can be improved.

[Program]

It is sufficient for the program according to the example embodiment 1 of the present invention to be a program that causes a computer to execute steps S1 to S11 shown in FIG. 6. The face authentication apparatus 10 and the face authentication method according to the example embodiment 1 can be realized by installing this program in the computer and executing this program. In this case, a processor of the computer functions as the acquisition unit 1, the determination unit 2, the prompting unit 3, the reception unit 4, the registration after input reception unit 5, the setting unit 6, and the additional registration unit 7, and performs processing.

Also, the program according to the example embodiment 1 may be executed by a computer system constituted by a plurality of computers. In this case, for example, each computer may function as any of the acquisition unit 1, the determination unit 2, the prompting unit 3, the reception unit 4, the registration after input reception unit 5, the setting unit 6, and the additional registration unit 7.

Effect in the Example Embodiment 1

According to the face authentication apparatus according to the example embodiment 1, it is possible to improve the accuracy of the face authentication by registering the registration data for face authentication and setting the threshold value in association with the registration data, without requiring the administrator to take time and effort.

Example Embodiment 2

Next, a face authentication apparatus 11 according to the example embodiment 2 of the present invention will be described with reference to the drawings. In the following description, the same configurations as those in the example embodiment 1 are denoted by the same reference numerals, and the description thereof will be omitted.

[Apparatus Configuration]

Figure 7:
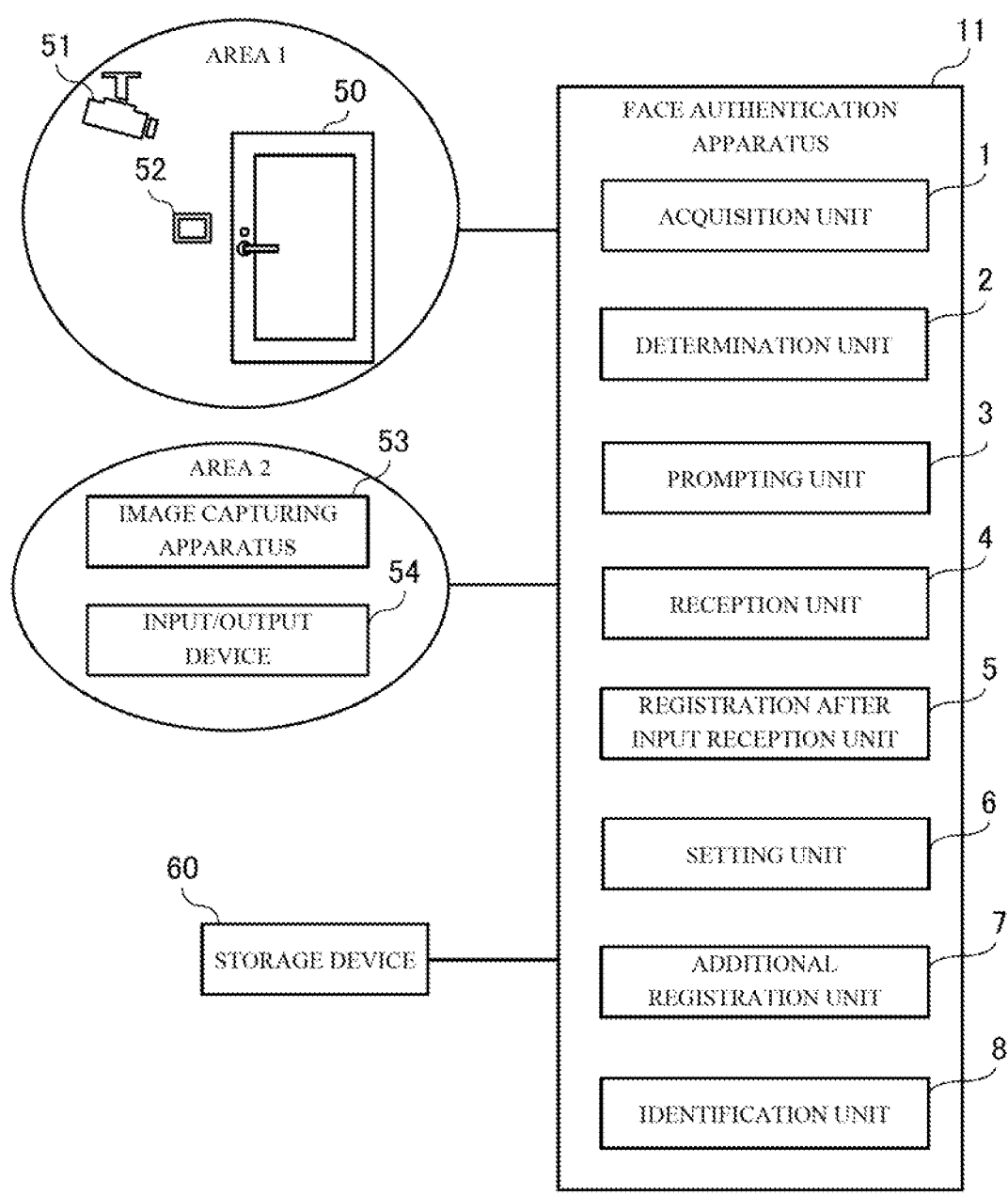
FIG. 7 is a diagram showing a configuration of a face authentication apparatus according to the example embodiment 2.

FIG. 7 is a diagram showing a configuration of the face authentication apparatus 11 according to the example embodiment 2. The face authentication apparatus 11 according to the example embodiment 2 further includes an identification unit 8 in addition to the acquisition unit 1, the determination unit 2, the prompting unit 3, the reception unit 4, the registration after input reception unit 5, the setting unit 6, and the additional registration unit 7 described in the example embodiment 1.

When the additional registration unit 7 additionally registers the face image data as the registration data, the identification unit 8 verifies the identity of the person in the face image data. For example, when the additional registration unit 7 registers the face image data of person A captured by the image capturing apparatus 51 in area 1 as the registration data, the identification unit 8 outputs a verifying signal to the input/output device 52 in the same area 1. The input/output device 52 displays a message such as "Are you Person A?" as well as operation buttons for "Yes" and "No", on a touch panel display. When Person A presses the "Yes" operation button, the identity verification is performed. The method of identity verification may be the method of entering a key code, or may be changed as appropriate.

[Apparatus Operations]

Figure 8:
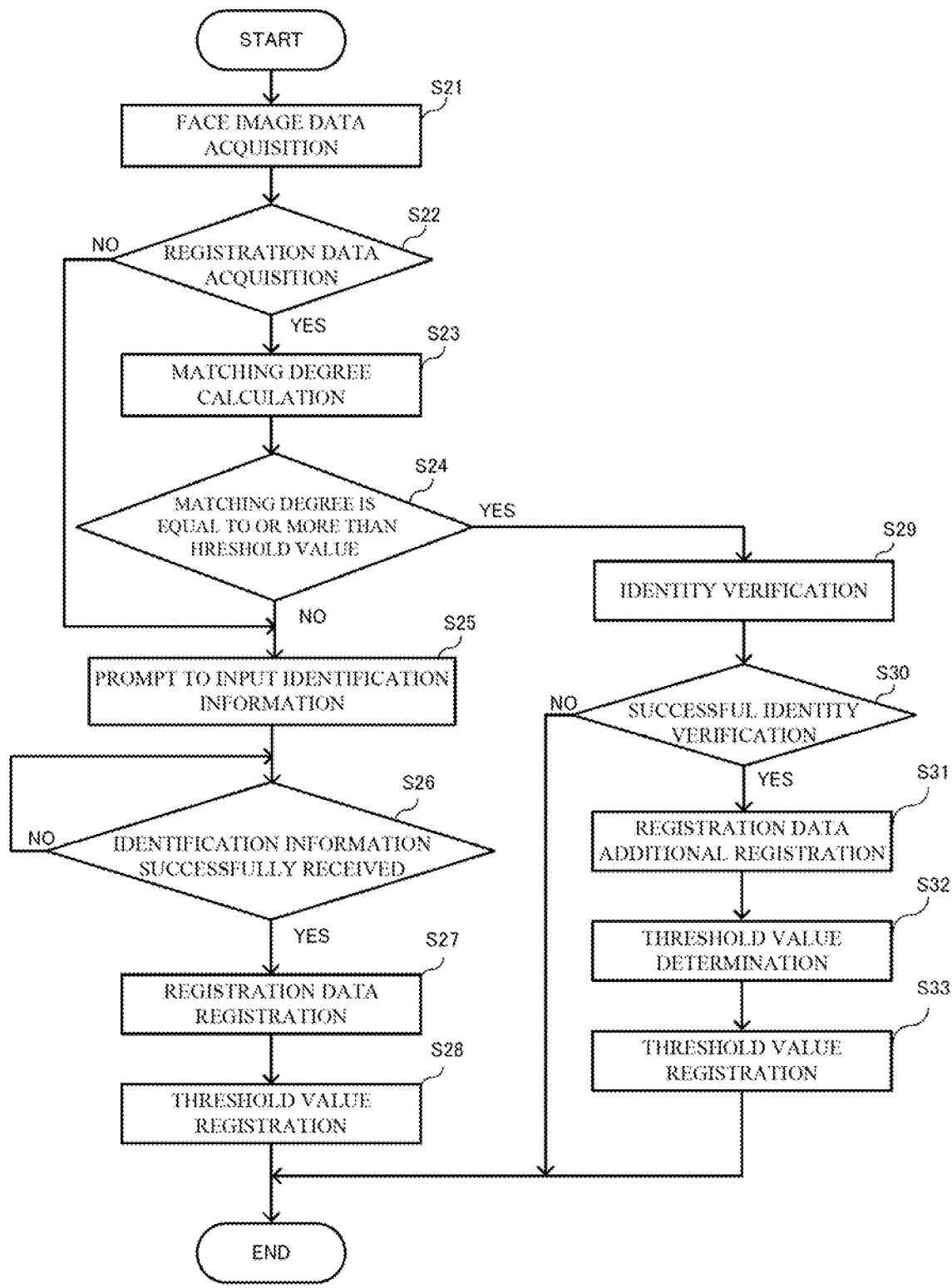
FIG. 8 is a flow diagram showing a process executed by the face authentication apparatus according to the example embodiment 2.

Next, the operation of the face authentication apparatus 11 according to the example embodiment 2 will be described with reference to FIG. 8. FIG. 8 is a flow diagram showing the process executed by the face authentication apparatus 11 according to the example embodiment 2.

Since the operations of S21 to S28 shown in FIG. 8 are the same as the operations of 51 to S8 shown in FIG. 6, the description thereof will be omitted.

In S24, when the degree of matching calculated in S23 is equal to or more than the threshold value (S24: YES), the identification unit 8 verifies the identity of the person (S29). The additional registration unit 7 determines whether the identification unit 8 successfully verifies the identity of the person (S30). When the identity verification is not successfully performed (S30: NO), the additional registration unit 7 ends this process without registering any additional registration data. When the identity verification is successfully performed (S30: YES), the additional registration unit 7 additionally registers the face image data acquired in S21 as registration data in the storage device 60 (S31). The setting unit 6 determines a threshold value based on the degree of matching calculated in S23 (S32). Then, the setting unit 6 registers the determined threshold value in association with the registration data registered in S31 (S33).

[Program]

It is sufficient for the program according to the example embodiment 2 of the present invention to be a program that causes a computer to execute steps S21 to S33 shown in FIG. 8. The face authentication apparatus 11 and the face authentication method according to the example embodiment 2 can be realized by installing this program in the computer and executing this program. In this case, a processor of the computer functions as the acquisition unit 1, the determination unit 2, the prompting unit 3, the reception unit 4, the registration after input reception unit 5, the setting unit 6, the additional registration unit 7, and the identification unit 8, and performs processing.

Also, the program according to the example embodiment 2 may be executed by a computer system constituted by a plurality of computers. In this case, for example, each computer may function as any of the acquisition unit 1, the determination unit 2, the prompting unit 3, the reception unit 4, the registration after input reception unit 5, the setting unit 6, the additional registration unit 7, and the identification unit 8.

Effect in the Example Embodiment 2

According to the face authentication apparatus according to the example embodiment 2, it is possible to improve the accuracy of the face authentication by registering the registration data for face authentication and setting the threshold value in association with the registration data, without requiring the administrator to take time and effort. Further, by verifying the identity of the person when registering the additional face image data, it is possible to prevent the registration of face image data of a different person, thereby reducing the risk of false authentication.

Example Embodiment 3

Next, a face authentication apparatus according to the example embodiment 3 of the present invention will be described with reference to the drawings. In the following description, the same configurations as those in the example embodiment 1 are denoted by the same reference numerals, and the description thereof will be omitted.

[Apparatus Configuration]

Figure 9:
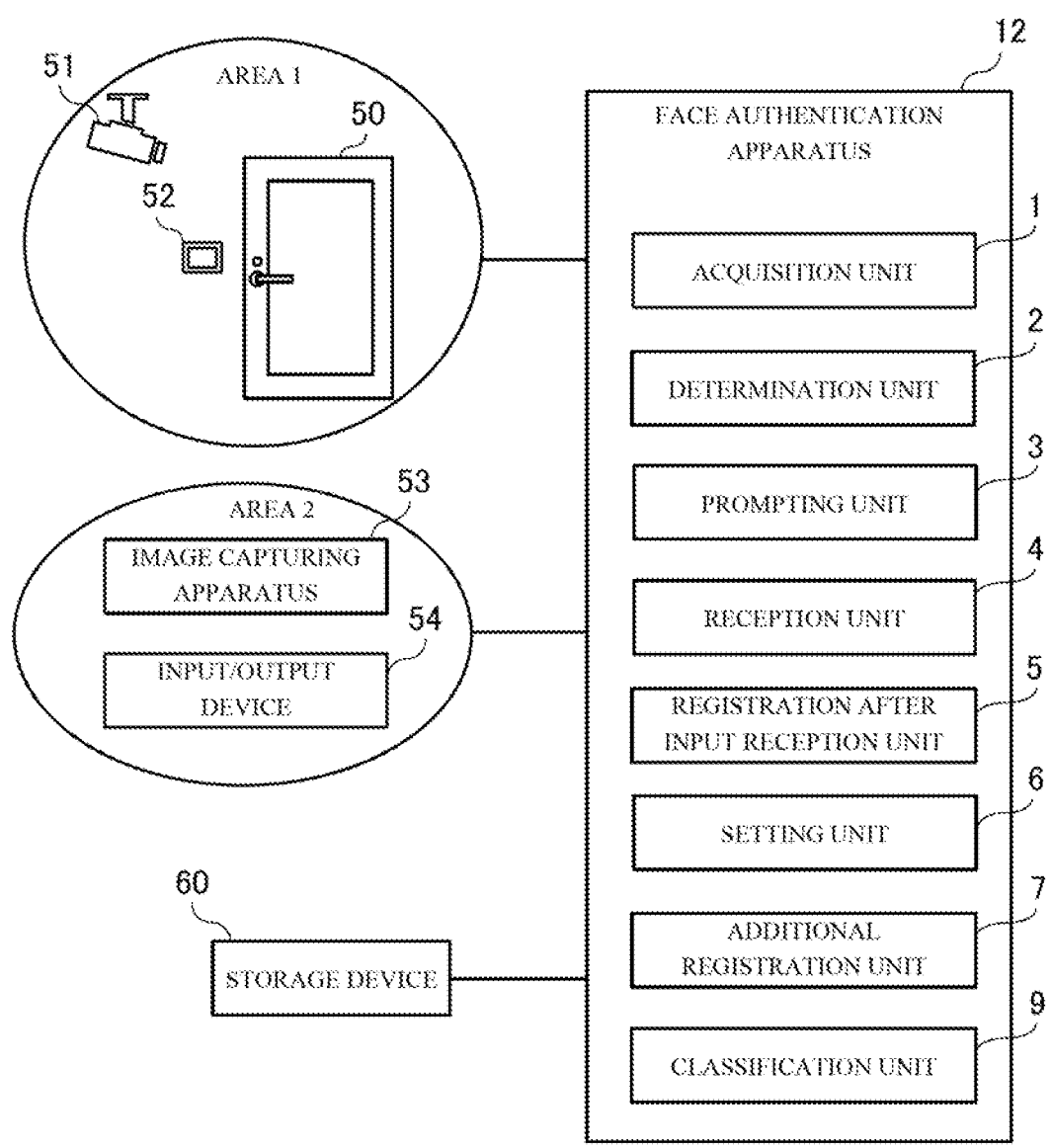
FIG. 9 is a diagram showing a configuration of a face authentication apparatus according to the example embodiment 3.

FIG. 9 is a diagram showing a configuration of the face authentication apparatus 12 according to the example embodiment 3. The face authentication apparatus 12 according to the example embodiment 3 further includes a classification unit 9 in addition to the acquisition unit 1, the determination unit 2, the prompting unit 3, the reception unit 4, the registration after input reception unit 5, the setting unit 6, and the additional registration unit 7 described in the example embodiment 1. In addition, the face authentication apparatus 12 may include the identification unit 8 in the example embodiment 2.

The classification unit 9 classifies the image capturing apparatuses into one or more groups based on an installation environment of each of the image capturing apparatuses. For example, the classification unit 9 classifies the image capturing apparatuses installed in an environment that is not exposed to sunlight all day into the same group.

In the example embodiment 3, the setting unit 6 applies the same rule to the capturing apparatuses belonging to the same group to determine the threshold value. When setting a threshold value for the first time for the registration data registered in association with the image capturing apparatus belonging to one group, the setting unit 6 sets a predetermined threshold value as an initial value of the group. When setting a threshold value for the second time or later for the registration data registered in association with the image capturing apparatus belonging to one group, the setting unit 6 sets a threshold value based on the threshold value set immediately before, the degree of matching between the face image data and the registration data used by the determination unit 2 for the determination, and the number of times the threshold value is set. Specifically, a value obtained by ((M×(P−1)+N)/P), which is represented by the threshold value M set immediately before, the degree of matching N between the face image data and the registration data used by the determination unit 2 for the determination, and the number of times P the threshold value is set, is set as a threshold value.

In addition, the setting unit 6 applies the rule for each person when setting a threshold value for the group classified by the classification unit 9. Specifically, it is assumed that person A and person B are imaged by the same image capturing apparatus, and a threshold value is already associated with the registration data of person A. In this case, when setting a threshold value for the registration data of person B, the setting unit 6 sets the threshold value without considering the threshold value associated with the registration data of person A.

Figure 10:
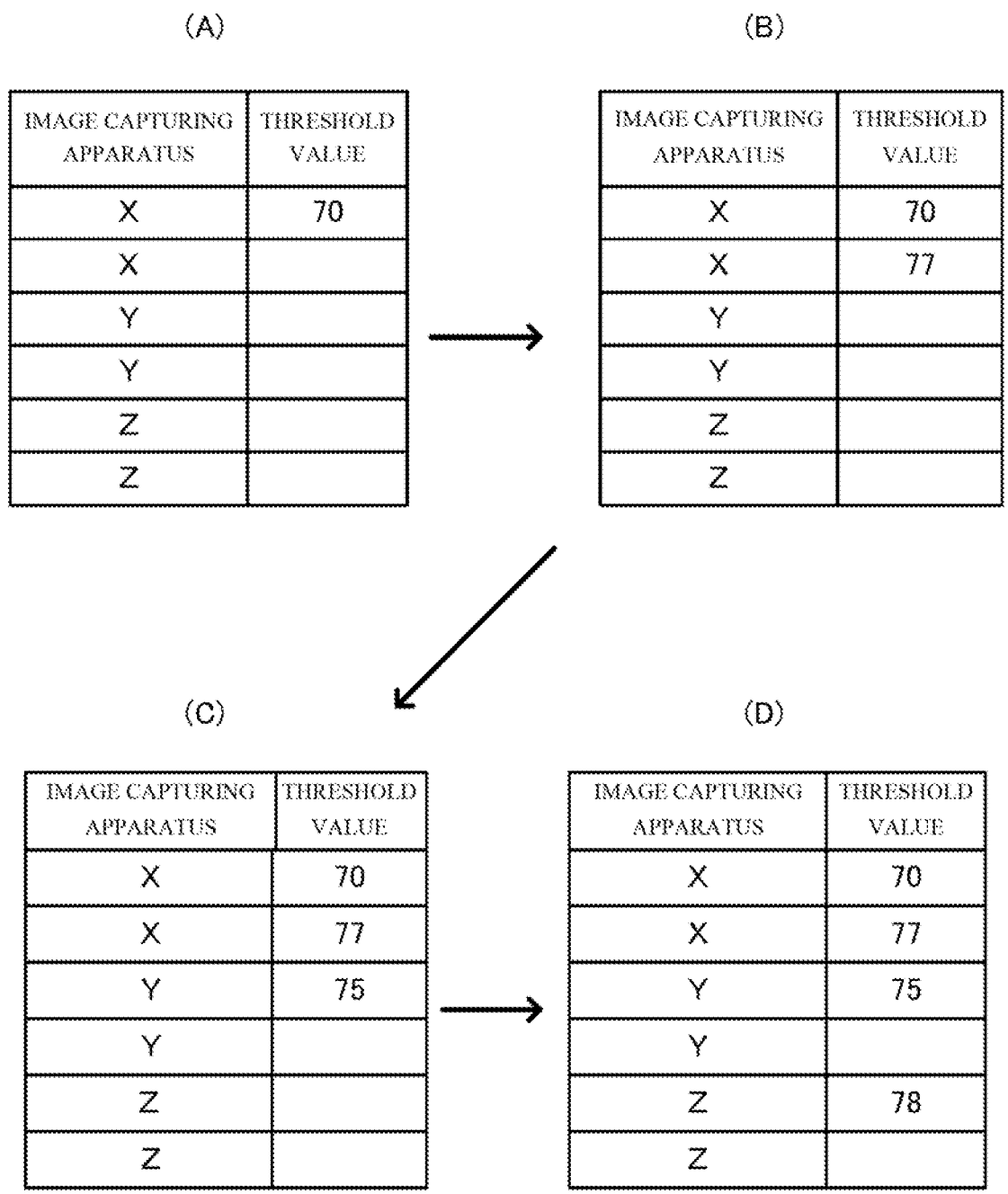
FIG. 10 illustrates how to determine threshold values for the image capturing apparatuses belonging to the same group.

A method of determining the threshold value by the setting unit 6 will be described with reference to FIG. 10. FIG. 10 illustrates how to determine threshold values for the image capturing apparatuses belonging to the same group. As a premise of the description of FIG. 10, the classification unit 9 classifies "image capturing apparatus X", "image capturing apparatus Y", and "image capturing apparatus Z" into the same group A. In addition, the setting unit 6 sets a threshold value for the registration data of the same person.

When initially registering a threshold value for the group A, the setting unit 6 sets a predetermined threshold value "70" (FIG. 10(A)). Then, when registering the face image data associated with the image capturing apparatus X, the setting unit 6 multiplies the threshold value "70" set immediately before by the number of times the threshold value is set at the time of setting the threshold value "70" is set. In FIG. 10(A), the setting unit 6 sets the threshold value for the first time. Next, the setting unit 6 adds the degree of matching (assumed to be "85") calculated by the matching degree calculating unit 23 at the time of face authentication to the above multiplication result. Further, the setting unit 6 divides the addition result by the number of times the threshold value is set this time. That is, the setting unit 6 calculates "(70×1+85)/2" and sets the calculated value "77" as a threshold (FIG. 10(B)).

Next, when registering the face image data in association with the image capturing apparatus Y, the setting unit 6 multiplies the threshold value "77" set immediately before by "2" which is the number of times the threshold value is set at the time of setting the threshold value "77" is set. The setting unit 6 adds the degree of matching (assumed to be "72") calculated by the matching degree calculating unit 23 at the time of face authentication to the above multiplication result. Further, the setting unit 6 divides the addition result by "3" which is the number of times the threshold value is set this time. That is, the setting unit 6 calculates "(77×2+72)/3" and sets the calculated value "75" as a threshold (FIG. 10(C)).

Then, when registering the face image data in association with the image capturing apparatus Z, the setting unit 6 multiplies the threshold value "75" set immediately before by "3" which is the number of times the threshold value is set at the time of setting the threshold value "75" is set. The setting unit 6 adds the degree of matching (assumed to be "85") calculated by the matching degree calculating unit 23 at the time of face authentication to the above multiplication result. Further, the setting unit 6 divides the addition result by "4" which is the number of times the threshold value is set this time. That is, the setting unit 6 calculates "(75×3+85)/4" and sets the calculated value "78" as a threshold (FIG. 10(D)).

[Apparatus Operations]

Figure 11:
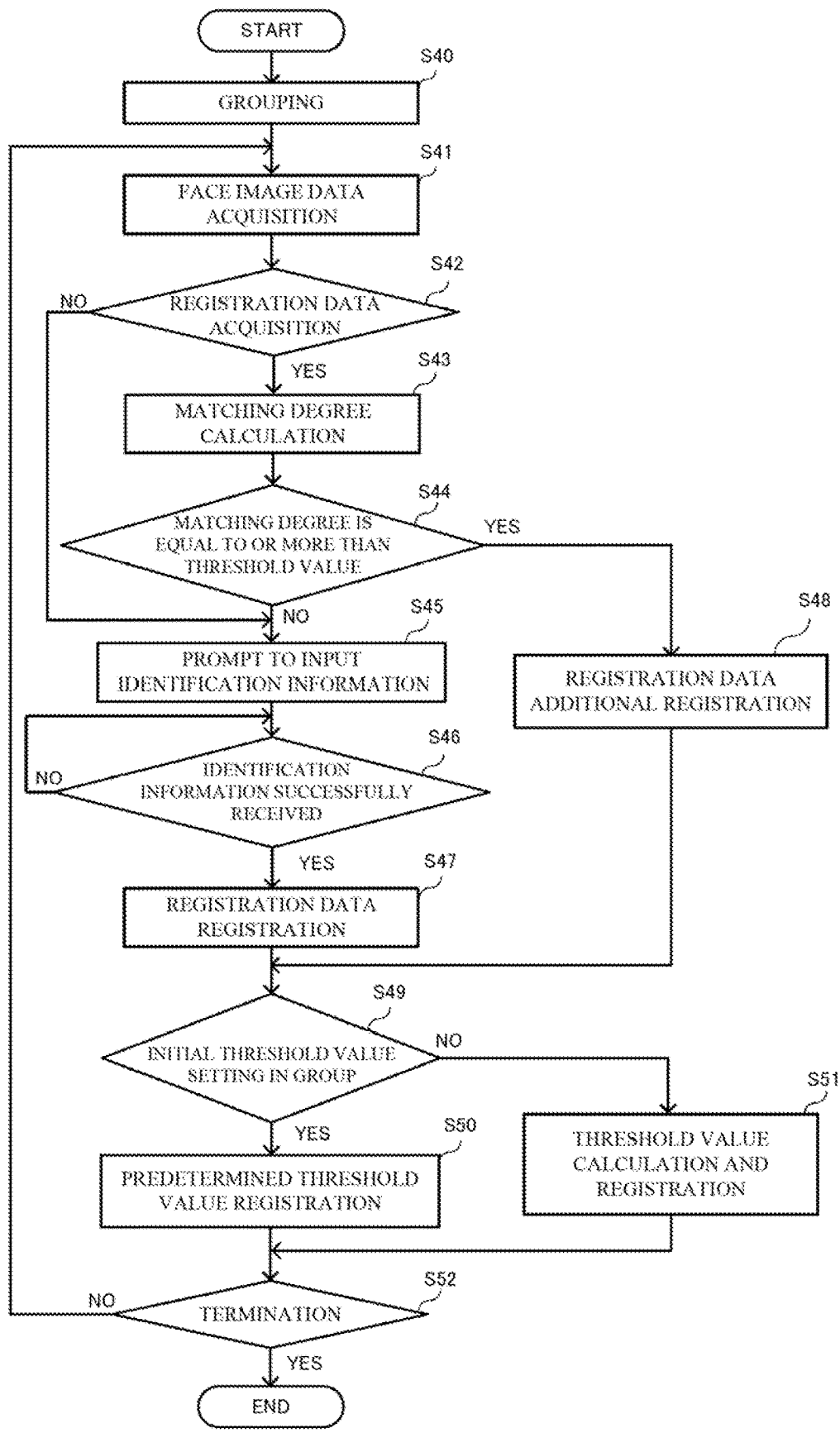
FIG. 11 is a flow diagram showing a process executed by the face authentication apparatus according to the example embodiment 3.

Next, the operation of the face authentication apparatus 12 according to the example embodiment 3 will be described with reference to FIG. 11. FIG. 11 is a flow diagram showing the process executed by the face authentication apparatus 12 according to the example embodiment 3.

First, the classification unit 9 performs grouping to classify the plurality of image capturing apparatuses into one or more groups based on the installation environment of each of the image capturing apparatuses (S40). The classification unit 9 stores the results of the grouping in the storage device 60, for example. The operations of the subsequent S41 to S47 are the same as the operations of S1 to S7 shown in FIG. 6, and therefore their description is omitted. Further, the operation of S48 is the same as the operation of S9 in FIG. 6.

When the face image data acquired in S41 is registered as the registration data (S47 or S48), the setting unit 6 determines whether the threshold value is set for the first time in the group to which the registration data registered in S47 or S48 belongs (S49). When the threshold value is set for the first time (S49: YES), the setting unit 6 registers the predetermined threshold value in association with the registration data registered in S47 or S48 (S50). When the threshold value is not set for the first time (S49: NO), the setting unit 6 calculates ((M×(P−1)+N)/P), which is defined by the threshold value M set immediately before, the degree of matching N calculated in S43, and the number of times P the threshold value is set, and then registers the calculated value in association with the registration data registered in S47 or S48 (S51).

After that, when the operation of the face authentication apparatus 12 is not terminated, that is, when the face authentication is continued (S52: NO), the process is repeated again from S41. When the operation of the face authentication apparatus 12 is terminated, for example, when the power of the face authentication apparatus 12 is turned off for maintenance or the like (S52: NO), this process is terminated. When the face authentication apparatus 12 is started up and face authentication is started, if the grouping of S40 is already executed and the result is stored in the storage device 60 or the like, the processing of S40 is skipped.

[Program]

It is sufficient for the program according to the example embodiment 3 of the present invention to be a program that causes a computer to execute steps S40 to S52 shown in FIG. 11. The face authentication apparatus 12 and the face authentication method according to the example embodiment 3 can be realized by installing this program in the computer and executing this program. In this case, a processor of the computer functions as the acquisition unit 1, the determination unit 2, the prompting unit 3, the reception unit 4, the registration after input reception unit 5, the setting unit 6, the additional registration unit 7, and the classification unit 9, and performs processing.

Also, the program according to the example embodiment 3 may be executed by a computer system constituted by a plurality of computers. In this case, for example, each computer may function as any of the acquisition unit 1, the determination unit 2, the prompting unit 3, the reception unit 4, the registration after input reception unit 5, the setting unit 6, the additional registration unit 7, and the classification unit 9.

Effect in the Example Embodiment 3

According to the face authentication apparatus according to the example embodiment 2, it is possible to improve the accuracy of the face authentication by registering the registration data for face authentication and setting the threshold value in association with the registration data, without requiring the administrator to take time and effort. Further, by grouping the image capturing apparatus under the similar environments, it is possible to set a threshold value suitable for the environment.

Modification Example

In the above-described example embodiments 1 to 3, the identification information is input from the input/output devices 52 and 54 installed in each area. However, the identification information may be input from a terminal (smartphone, tablet or notebook PC) owned by an individual. Further, in the example embodiments 1 to 3, the number of areas is two (area 1 and area 2). However, the number of areas may be one or three or more. Further, a plurality of image capturing apparatuses may be installed in one area.

[Physical Configuration]

Figure 12:
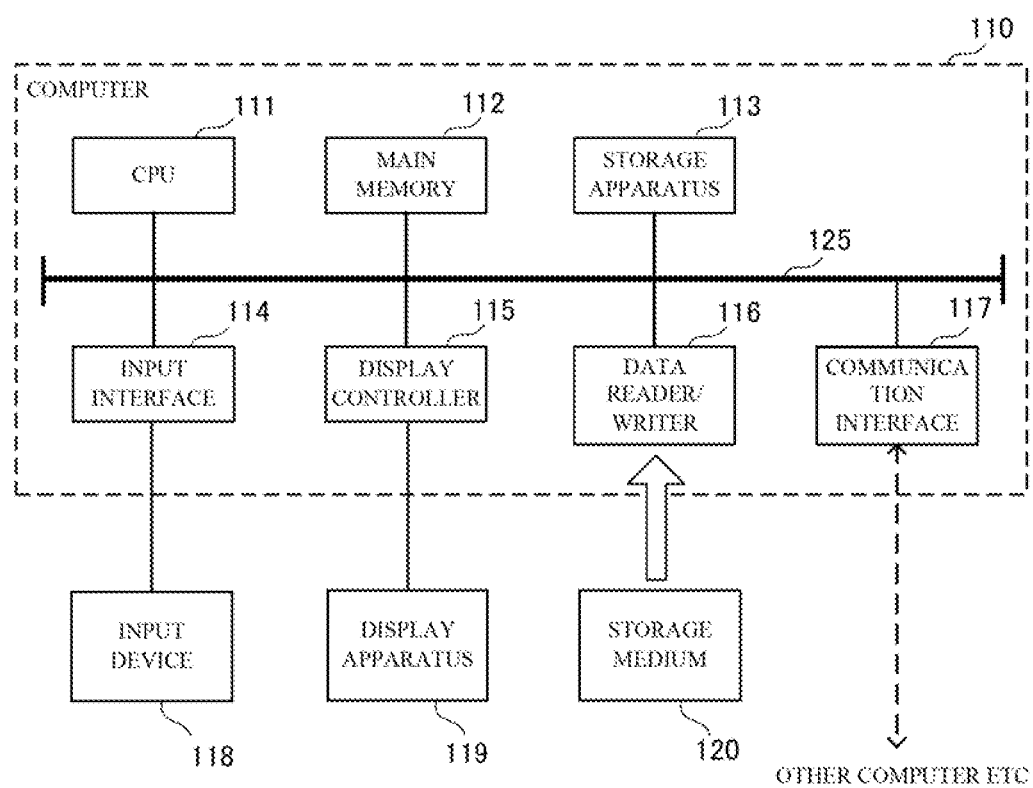
FIG. 12 is a block diagram showing an example of a computer that realizes the image capturing apparatuses according to the example embodiments 1 to 3.

Here, a computer that realizes the face authentication apparatus by executing the programs in the example embodiments 1 to 3 will be described with reference to FIG. 12. FIG. 12 is a block diagram illustrating one example of a computer realizing the face authentication apparatus in the example embodiments 1 to 3.

As illustrated in FIG. 12, a computer 110 includes a CPU 111, a main memory 112, a storage device 113, an input interface 114, a display controller 115, a data reader/writer 116, and a communication interface 117. These components are connected via a bus 125 so as to be capable of performing data communication with one another. Note that the computer 110 may include a graphics processing unit (GPU) or a field-programmable gate array (FPGA) in addition to the CPU 111 or in place of the CPU 111.

The CPU 111 loads the programs (codes) in the example embodiment 1 to 3, which is stored in the storage device 113, onto the main memory 112, and performs various computations by executing these codes in a predetermined order. The main memory 112 is typically a volatile storage device such as a dynamic random access memory (DRAM). Furthermore, the programs in the example embodiments 1 to 3 are provided in a state such that the program is stored in a computer readable recording medium 120. Note that the programs in the example embodiments 1 to 3 may also be programs that are distributed on the Internet, to which the computer 110 is connected via the communication interface 117.

In addition, specific examples of the storage device 113 include semiconductor storage devices such as a flash memory, in addition to hard disk drives. The input interface 114 mediates data transmission between the CPU 111 and input equipment 118 such as a keyboard and a mouse. The display controller 115 is connected to a display device 119, and controls the display performed by the display device 119.

The data reader/writer 116 mediates data transmission between the CPU 111 and the recording medium 120, and executes the reading out of the program from the recording medium 120 and the writing of results of processing in the computer 110 to the recording medium 120. The communication interface 117 mediates data transmission between the CPU 111 and other computers.

Furthermore, specific examples of the recording medium 120 include a general-purpose semiconductor storage device such as a CompactFlash (registered trademark, CF) card or a Secure Digital (SD) card, a magnetic recording medium such as a flexible disk, and an optical recording medium such as a compact disk read-only memory (CD-ROM).

Note that the face authentication apparatuses in the example embodiment 1 to 3 can also be realized by using pieces of hardware corresponding to the respective units, rather than using a computer on which the program is installed. Furthermore, a portion of the face authentication apparatus may be realized by using a program, and the remaining portion of the face authentication apparatus may be realized by using hardware.

While a part of or the entirety of the above-described example embodiment can be expressed by (Supplementary note 1) to (Supplementary note 24) described in the following, the invention is not limited to the following description.

(Supplementary Note 1)

A face authentication apparatus comprising:

an acquisition unit for acquiring face image data of a person from an image capturing apparatus, a determination unit for determining whether registration data, having degree of matching with the face image data that is equal to or more than a threshold value, is registered in a storage device, a prompting unit for prompting the person to input identifying information when the determination unit determines that the registration data is not registered in the storage device, a reception unit for receiving the identifying information input, a registration after input reception unit for registering the face image data as registration data in the storage device when the reception unit successfully receives the identifying information, and a setting unit for setting a threshold value, to be used by the determination unit, in association with the registration data registered by the registration after input reception unit.

(Supplementary Note 2)

The face authentication apparatus according to Supplementary note 1, wherein the acquisition unit acquires the face image data from different image capturing apparatuses, the registration after input reception unit registers the face image data as registration data in association with the image capturing apparatus from which the face image data is acquired.

(Supplementary Note 3)

The face authentication apparatus according to Supplementary note 1 or 2, wherein the registration after input reception unit registers registration data in a storage area, being different from a storage area that registration data is registered in advance in the storage device.

(Supplementary Note 4)

The face authentication apparatus according to any one of Supplementary notes 1 to 3, further comprising:

an additional registration unit for registering the face image data as registration data in the storage device when the determination unit determines that the registration data, having degree of matching with the face image data that is equal to or more than a threshold value, is registered in the storage device, wherein, the setting unit sets a threshold value, being determined from the degree of matching between the face image data and the registration data used for determination by the determination unit, in association with the registration data registered by the additional registration unit.

(Supplementary Note 5)

The face authentication apparatus according to Supplementary note 4, wherein the acquisition unit acquires the face image data from different image capturing apparatuses, the additional registration unit registers the face image data as registration data in association with the image capturing apparatus from which the face image data is acquired.

(Supplementary Note 6)

The face authentication apparatus according to Supplementary note 5, further comprising:

a classification unit for classifying the image capturing apparatuses into one or more groups based on an installation environment of each of the image capturing apparatuses, wherein when a number of times the threshold value is set for the registration data registered in association with the image capturing apparatus in the group classified by the classification unit is P (P=1), the setting unit sets a predetermined threshold value, and when a number of times the threshold value is set for the registration data registered in association with the image capturing apparatus in the group classified by the classification unit is P (P≥2), the setting unit sets a value obtained by ((M×(P−1)+N)/P), which is represented by the threshold value M set immediately before and the degree of matching N between the face image data and the registration data used by the determination unit for determination, as the threshold value.

(Supplementary Note 7)

The face authentication apparatus according to any one of Supplementary notes 4 to 7, wherein the additional registration unit registers registration data in a storage area, being different from a storage area that registration data is registered in advance, in the storage device.

(Supplementary Note 8)

The face authentication apparatus according to any one of Supplementary notes 4 to 6, further comprising:

an identification unit for verifying an identity of the person, wherein the additional registration unit registers registration data in the storage device when the identification unit successfully verifies the identity of the person.

(Supplementary Note 9)

A face authentication method comprising:

a step of acquiring face image data of a person from an image capturing apparatus, a step of determining whether registration data, having degree of matching with the face image data that is equal to or more than a threshold value, is registered in a storage device, a step of prompting the person to input identifying information when it is determined that the registration data is not registered in the storage device, a step of receiving the identifying information input, a step of registering the face image data as registration data in the storage device when the identifying information is successfully received, and a step of setting a threshold value, to be used in the step of determining, in association with the registration data registered.

(Supplementary Note 10)

The face authentication method according to Supplementary note 9, wherein in the step of acquiring, the face image data is acquired from different image capturing apparatuses, when registering the face image data as registration data, the face image data is registered as the registration data in association with the image capturing apparatus from which the face image data is acquired.

(Supplementary Note 11)

The face authentication method according to Supplementary note 9 or 10, wherein in the step of registering, the registration data is registered in a storage area, being different from a storage area that registration data is registered in advance, in the storage device.

(Supplementary Note 12)

The face authentication method according to any one of Supplementary notes 9 to 11, further comprising:

a step of registering the face image data as registration data in the storage device when it is determined that registration data, having the degree of matching with the face image data that is equal to or more than a threshold value, is registered in the storage device, wherein, in the step of setting, a threshold value, being determined from the degree of matching between the face image data and the registration data used in the step of determining whether registration data having the degree of matching equal to or more than a threshold value is registered, is set in association with the registration data registered in the step of registering when it is determined that the registration data having the degree of matching equal to or more than a threshold value is registered.

(Supplementary Note 13)

The face authentication method according to Supplementary note 12, wherein
in the step of acquiring, the face image data is acquired from different image capturing apparatuses,
in the step of registering when it is determined that the registration data having the degree of matching equal to or more than a threshold value is registered, the face image data is registered as the registration data in association with the image capturing apparatus from which the face image data is acquired.

(Supplementary Note 14)

The face authentication method according to Supplementary note 13, further comprising:
a step of classifying the image capturing apparatuses into one or more groups based on an installation environment of each of the image capturing apparatuses, wherein
in the step of when setting,
when a number of times the threshold value is set for the registration data registered in association with the image capturing apparatus in the group classified in the step of classifying is P (P=1), a predetermined threshold value is set, and
when a number of times the threshold value is set for the registration data registered in association with the image capturing apparatus in the group classified in the step of classifying is P (P≥2), a value obtained by ((M×(P−1)+N)/P), which is represented by the threshold value M set immediately before and the degree of matching N between the face image data and the registration data used in the step of determining whether registration data having the degree of matching equal to or more than a threshold value is registered, as the threshold value.

(Supplementary Note 15)

The face authentication method according to any one of Supplementary notes 12 to 14, wherein
in the step of registering when it is determined that the registration data having the degree of matching equal to or more than a threshold value is registered,
the registration data is registered in a storage area, being different from a storage area that registration data is registered in advance, in the storage device.

(Supplementary Note 16)

The face authentication method according to any one of Supplementary notes 12 to 15, further comprising:
a step of verifying an identity of the person, wherein
in the step of registering when it is determined that the registration data having the degree of matching equal to or more than a threshold value is registered in the storage device, registration data is registered in the storage device when the identity of the person is successfully verified in the step of verifying.

(Supplementary Note 17)

A computer-readable recording medium that includes recorded thereon, a program including instructions that cause a computer to execute:
a step of determining whether registration data, having degree of matching with the face image data of a person acquired from an image capturing apparatus that is equal to or more than a threshold value, is registered in a storage device,
a step of prompting the person to input identifying information when it is determined that the registration data is not registered in the storage device,
a step of receiving the identifying information input,
a step of registering the face image data as registration data in the storage device when an input of the identifying information is successfully received, and
a step of setting a threshold value, to be used in the step of determining, in association with the registration data registered.

(Supplementary Note 18)

The computer-readable recording medium according to Supplementary note 17, wherein
when the face image data is acquired from different image capturing apparatuses,
in the step of registering, the face image data is registered as the registration data in association with the image capturing apparatus from which the face image data is acquired.

(Supplementary Note 19)

The computer-readable recording medium according to Supplementary note 17 or 18, wherein
in the registering step,
the registration data is registered in a storage area, being different from a storage area that registration data is registered in advance, in the storage device.

(Supplementary Note 20)

The computer-readable recording medium according to any one of Supplementary notes 17 to 19, wherein
the program further includes an instruction that cause the computer to execute:
a step of registering the face image data as registration data in the storage device when it is determined that registration data, having the degree of matching with the face image data that is equal to or more than a threshold value, is registered in the storage device, and wherein,
in the step of setting,
a threshold value, being determined from the degree of matching between the face image data and the registration data used in the step of determining whether registration data having the degree of matching equal to or more than a threshold value is registered, is set in association with the registration data registered in the step of registering when it is determined that the registration data having the degree of matching equal to or more than a threshold value is registered.

(Supplementary Note 21)

The computer-readable recording medium according to Supplementary note 20, wherein
when the face image data is acquired from different image capturing apparatuses,
in the step of registering when it is determined that the registration data having the degree of matching equal to or more than a threshold value is registered, the face image data is registered as the registration data in association with the image capturing apparatus from which the face image data is acquired.

(Supplementary Note 22)

The computer-readable recording medium according to Supplementary note 21, wherein
the program further includes an instruction that cause the computer to execute:
a step of classifying the image capturing apparatuses into one or more groups based on an installation environment of each of the image capturing apparatuses, and wherein in the step of setting,
when a number of times the threshold value is set for the registration data registered in association with the image capturing apparatus in the group classified is P (P=1), a predetermined threshold value is set, and
when a number of times the threshold value is set for the registration data registered in association with the image capturing apparatus in the group classified is P (P≥2), a value obtained by ((M×(P−1)+N)/P), which is represented by the threshold value M set immediately before and the degree of matching N between the face image data and the registration data used in the step of determining whether registration data having the degree of matching equal to or more than a threshold value is registered, as the threshold value.

(Supplementary Note 23)

The computer-readable recording medium according to any one of Supplementary notes 20 to 22, wherein
in the step of registering when it is determined that the registration data having the degree of matching equal to or more than a threshold value is registered,
the registration data is registered in a storage area, being different from a storage area that registration data is registered in advance, in the storage device.

(Supplementary Note 24)

The computer-readable recording medium according to any one of Supplementary notes 20 to 23, wherein
the program further includes an instruction that cause the computer to execute:
a step of verifying an identity of the person, and wherein
in the step of registering when it is determined that the registration data having the degree of matching equal to or more than a threshold value is registered, registration data is registered in the storage device when the identity of the person is successfully verified in the step of verifying the identity of the person.

The invention has been described with reference to example embodiments above, but the invention is not limited to the above-described example embodiments. Within the scope of the invention, various changes that could be understood by a person skilled in the art could be applied to the configurations and details of the invention.

This application claims priority to Japanese Patent Application No. 2019-105725, filed on Jun. 5, 2019, the disclosure of which is incorporated in its entirety herein by reference.

INDUSTRIAL APPLICABILITY

As described above, the present invention is useful in various fields in which face authentication is used.

REFERENCE SIGNS LIST

1 Acquisition unit
2 Determination unit
3 Prompting unit
4 Reception unit
5 Registration after input reception unit
6 Setting unit
7 Additional registration unit
8 Identification unit
9 Classification unit
10, 11, 12 Face authentication apparatus
110 Computer
111 CPU
112 Main memory
113 Storage device
114 Input interface
115 Display controller
116 Data reader/writer
117 Communication interface
118 Input equipment
119 Display device
120 Recording medium
125 Bus

What is claimed is:

1. A face authentication apparatus comprising:
a memory storing instructions; and
a processor configured to execute the instructions to:
acquire face image data of a person from an image capturing apparatus;
determine whether registration data, having degree of matching with the face image data that is equal to or more than a threshold value, is registered in a storage device;
prompt the person to input identifying information when having determined that the registration data is not registered in the storage device;
receive the identifying information input;
register the face image data as registration data in the storage device when having successfully receive d the identifying information; and
set a threshold value, to be used when determining whether the registration data is registered in the storage device, in association with the registration data registered when having successfully received the identifying information, wherein
image capturing apparatuses are arranged in different locations in a specific area, and face image data is acquired from each image capturing apparatus,
the face image data is registered as registration data in association with the image capturing apparatus that acquired the face image data, and
the image capturing apparatuses are classified into groups based on an installation environment of each of the plurality of image capturing devices, and the same rules are applied to determine thresholds for image capturing apparatus belonging to the same group.

2. The face authentication apparatus according to claim 1, wherein
the processor registers registration data in a storage area that is different from a storage area that registration data is registered in advance, in the storage device.

3. The face authentication apparatus according to claim 1, wherein the processor is configured to execute the instructions to further:
register the face image data as registration data in the storage device when having determined that the registration data, having degree of matching with the face image data that is equal to or more than a threshold value, is registered in the storage device, wherein,
the processor sets a threshold value, being determined from the degree of matching between the face image data and the registration data used when determining whether the registration data is registered in the storage device, in association with the registration data registered when having successfully received the identifying information.

4. The face authentication apparatus according to claim 3, wherein
when a number of times the threshold value is set for the registration data registered in association with the image capturing apparatus in the classified group is P (P=1), the processor sets a predetermined threshold value, and when a number of times the threshold value is set for the registration data registered in association with the image capturing apparatus in the classified group is P (P≥2), the processor sets a value obtained by ((M×(P−1)+N)/P), which is represented by the threshold value M set immediately before and the degree of matching N between the face image data and the registration data used when determining whether the registration data is registered in the storage device, as the threshold value.

5. The face authentication apparatus according to claim 3, wherein
the processor registers registration data in an address area that is different from an address storage area that registration data is registered in advance, in the storage device.

6. The face authentication apparatus according to claim 3, wherein the processor is configured to execute the instructions to further:
verify an identity of the person, wherein
the processor registers registration data in the storage device when the processor successfully verifies the identity of the person.

7. A face authentication method performed by a computer and comprising:
acquiring face image data of a person from an image capturing apparatus,
determining whether registration data, having degree of matching with the face image data that is equal to or more than a threshold value, is registered in a storage device,
prompting the person to input identifying information when it is determined that the registration data is not registered in the storage device,
receiving the identifying information input,
registering the face image data as registration data in the storage device when the identifying information is successfully received, and
setting a threshold value, to be used to determine whether registration data having the degree of matching equal to or more than a threshold value is registered, in association with the registration data registered, wherein
image capturing apparatuses are arranged in different locations in a specific area, and face image data is acquired from each image capturing apparatus,
the face image data is registered as registration data in association with the image capturing apparatus that acquired the face image data, and
the image capturing apparatuses are classified into groups based on an installation environment of each of the plurality of image capturing devices, and the same rules are applied to determine thresholds for image capturing apparatus belonging to the same group.

8. The face authentication method according to claim 7, wherein
when registering the face image data as registration data, the registration data is registered in a storage area, being that is different from a storage area that registration data is registered in advance, in the storage device.

9. The face authentication method according to claim 7, further comprising:
registering the face image data as registration data in the storage device when it is determined that registration data, having the degree of matching with the face image data that is equal to or more than a threshold value, is registered in the storage device, wherein,
when setting a threshold value in association with the registration data,
a threshold value, being determined from the degree of matching between the face image data and the registration data used in determining whether registration data having the degree of matching equal to or more than a threshold value is registered in the storage device, is set in association with the registration data registered when it is determined that the registration data having the degree of matching equal to or more than a threshold value is registered.

10. The face authentication method according to claim 9, further comprising:
when setting a threshold value in association with the registration data,
when a number of times the threshold value is set for the registration data registered in association with the image capturing apparatus in the group classified is P (P=1), a predetermined threshold value is set, and
when a number of times the threshold value is set for the registration data registered in association with the image capturing apparatus in the group classified is P (P≥2), a value obtained by ((M×(P−1)+N)/P), which is represented by the threshold value M set immediately before and the degree of matching N between the face image data and the registration data used in determining whether registration data having the degree of matching equal to or more than a threshold value is registered, as the threshold value.

11. A non-transitory computer-readable recording medium storing a program executable by a computer to perform processing comprising:
determining whether registration data, having degree of matching with the face image data of a person acquired from an image capturing apparatus that is equal to or more than a threshold value, is registered in a storage device,
prompting the person to input identifying information when it is determined that the registration data is not registered in the storage device,
receiving the identifying information input,
registering the face image data as registration data in the storage device when an input of the identifying information is successfully received, and
setting a threshold value, to be used to determine whether registration data having the degree of matching equal to or more than a threshold value is registered, in association with the registration data registered, wherein
image capturing apparatuses are arranged in different locations in a specific area, and face image data is acquired from each image capturing apparatus,
the face image data is registered as registration data in association with the image capturing apparatus that acquired the face image data, and
the image capturing apparatuses are classified into groups based on an installation environment of each of the plurality of image capturing devices, and the same rules are applied to determine thresholds for image capturing apparatus belonging to the same group.

12. The non-transitory computer-readable recording medium according to claim 11, wherein
when registering the face image data as registration data, the registration data is registered in a storage area that is different from a storage area that registration data is registered in advance, in the storage device.

13. The non-transitory computer-readable recording medium according to claim 11, wherein the processing further comprises:
    registering the face image data as registration data in the storage device when it is determined that registration data having the degree of matching equal to or more than a threshold value is registered in the storage device, and wherein,
    when setting a threshold value in association with the registration data,
    a threshold value, being determined from the degree of matching between the face image data and the registration data used in determining whether registration data having the degree of matching equal to or more than a threshold value is registered in the storage device, is set in association with the registration data registered when it is determined that the registration data having the degree of matching equal to or more than a threshold value is registered.

14. The non-transitory computer-readable recording medium according to claim 13, wherein
    when setting a threshold value in association with the registration data,
        when a number of times the threshold value is set for the registration data registered in association with the image capturing apparatus in the group classified is P (P=1), a predetermined threshold value is set, and
        when a number of times the threshold value is set for the registration data registered in association with the image capturing apparatus in the group classified is P (P≥2), a value obtained by $((M \times (P-1)+N)/P)$, which is represented by the threshold value M set immediately before and the degree of matching N between the face image data and the registration data used in determining whether registration data having the degree of matching equal to or more than a threshold value is registered, as the threshold value.

* * * * *